Oct. 11, 1938.    G. R. BLANCHARD    2,132,928
DRIVE ASSEMBLY
Filed Nov. 25, 1936

Inventor
George R. Blanchard
BY
Parker, Carlson, Pitzner & Hubbard
Attorneys

Patented Oct. 11, 1938

2,132,928

UNITED STATES PATENT OFFICE 2,132,928

DRIVE ASSEMBLY

George R. Blanchard, Chicago, Ill.

Application November 25, 1936, Serial No. 112,659

7 Claims. (Cl. 64—30)

The invention relates generally to a drive assembly and more particularly to a structure for supporting and rotatably driving a pan or the like.

The general object of the invention is to provide a combined drive and support for rotating a relatively wide pan at a moderate speed, and which holds the pan steady during rotation and permits the pan to be stopped at will without stopping the driving means and without placing an undue load on the driving means when the pan is held against rotation.

Another object is to provide, in a drive of the foregoing character, a connection between the source of power and the pan, which is of inexpensive but rugged construction and which may be readily assembled in a relation fully capable of withstanding the stresses to which it is subjected.

It is also an object to provide a drive including a bearing of the rolling element type normally serving to provide a driving connection between the driving and driven members but having a rolling action when the driven member is held against rotation.

A further object is to provide a novel method of assembling a drive of the foregoing character.

Other objects and advantages will become apparent from the following description taken in connection with the accompanying drawing, in which.

Figure 1:
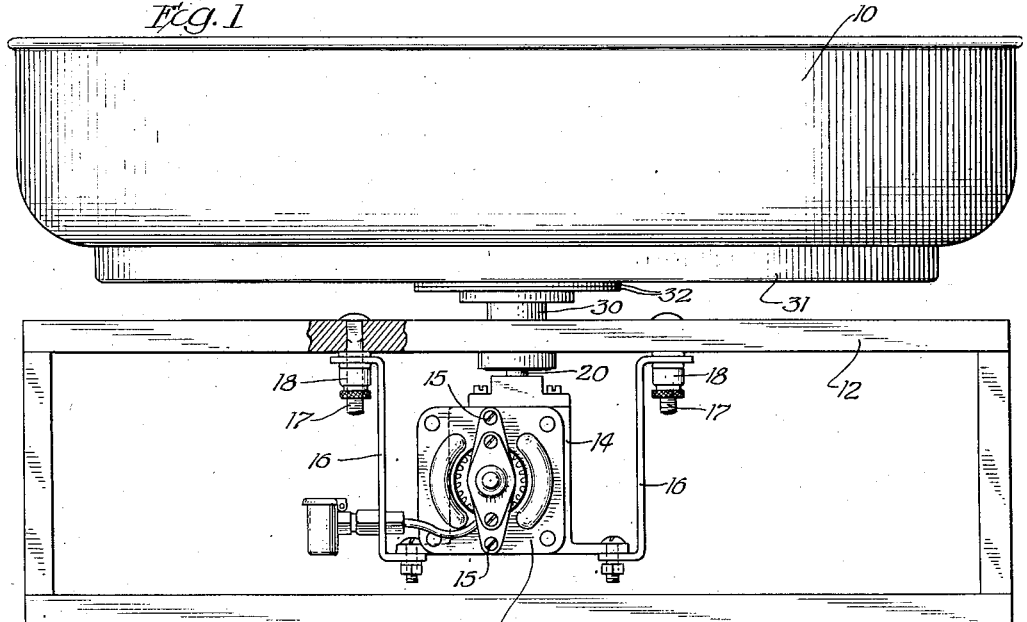
Figure 1 is an elevational view of a structure embodying the features of the invention.
Figure 2:
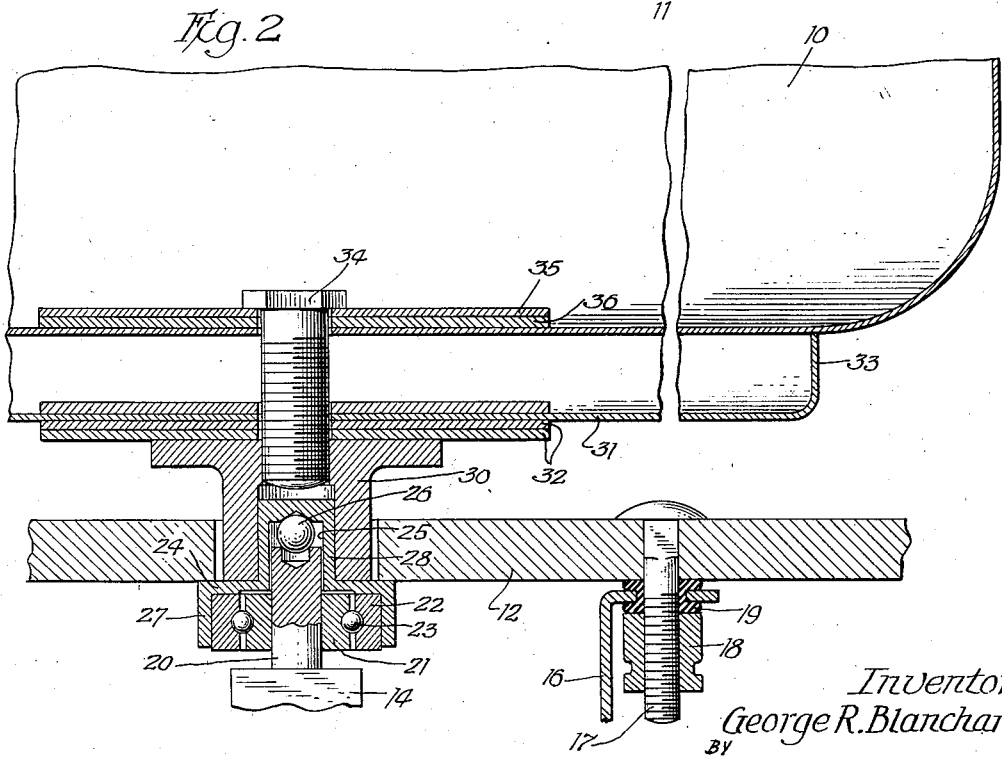
Fig. 2 is an enlarged fragmentary vertical section of the structure shown in Fig. 1.

Structure embodying the present invention is designed especially for rotating and supporting a relatively large pan for use in the retail display of food products such as nut meats. In such use, the pan may have a plurality of divisions for different kinds of nut meats and may be rotated to attract attention thereto and to bring the various divisions to an accessible position. The pan thus compactly holds the nut meats and prominently displays them by successively bringing the various divisions to attention. When some of the nut meats are to be removed from the pan, it is desirable to so arrange the drive structure that the rotation of the pan may be quickly stopped without stopping the driving means. The drive structure must, under such conditions, be such that no excessive load is placed on the driving means when the pan is stopped. It is also desirable to provide a drive structure which is inexpensive but rugged.

To fulfill these ends, the invention comprises generally a base structure which carries a shaft driven from a suitable source of power. A driven member is mounted on the shaft by a novel method of assembly with a bearing interposed therebetween. The driven member is shaped to coact with a member secured to the pan for the purpose of driving the pan, of supporting the weight thereof, of properly centering the pan and, at the same time, permitting the pan to be readily removed. The above-mentioned bearing is preloaded by placing a squeezing pressure thereon to the end that the driven member and drive shaft normally rotate together. However, when the pan is held against rotation to permit the removal of nut meats, the bearing, which is preferably of the rolling element type, permits the driven member to be stopped while the driving member continues to rotate without placing an undue load on the source of power.

As shown in the drawing, the pan is indicated at 10, and the fixed base structure is indicated generally at 11. The base structure in the present instance preferably comprises a box-like structure having a top member 12 and housing the drive mechanism.

The drive mechanism comprises a source of power such as an electric motor 13 and a reduction gearing unit 14. The motor 13 is preferably supported by being secured to the gearing unit 14 as by screws 15, while the gearing unit 14 is supported from the top member 12 of the base by a pair of brackets 16. As shown in the drawing, the brackets 16 are secured to the top member 12 by bolts 17 extending downwardly through the top member 12 and the brackets 16, the bolts 17 being provided with knurled nuts 18. To cushion the support, rubber grommets 19 surround the bolts 17 and are interposed between the brackets and the top member.

Extending upwardly from the gearing unit 14 is a rotary drive shaft 20 which supports the pan 10 and by which the pan is driven. As mentioned above, the principal feature of the invention is to so support the pan that it will normally be rotated by the shaft 20 but may be held against rotation therewith without placing an undue load on the motor 13. To this end, a bearing of the rolling element type is mounted upon the drive shaft 20 adjacent but spaced from the upper end thereof. In the present instance, the bearing comprises an inner race 21 and an outer race 22 with a plurality of balls 23 interposed therebetween. The inner race 21 is rigidly secured on the shaft 20.

Cooperating with the drive shaft and bearing is a driven member 24 having a central bore 25 fitting over the end of the shaft 20. Within the bore and bearing against the end of the shaft is a thrust element comprising in the present instance a ball 26, the end of the shaft and the driving member being recessed to hold the ball in place. The driven member 24 is of cup-like form to provide an annular portion 27 adapted to encircle the outer race 22.

In order that the driven member may normally rotate with the shaft 20, the annular portion 27 is so dimensioned as to preload or produce a squeezing pressure on the bearing. In assembling the annular portion on the outer race 22, the annular portion is preferably shrunk onto the race 22 to produce such preloading or squeezing pressure. The effect of such preloading is to cause a resistance to relative rotation between the inner and outer race so that the driven member will normally be driven upon rotation of the shaft. However, when the driven member is held against rotation, the balls 23 perform their normal rolling function and prevent an undue load being placed upon the motor 13. Thus, the driven member when free is rotated by the drive shaft but may be held against rotation without danger of harming the motor by placing an overload thereon.

The driven member 24 is adapted to be connected to the pan 10, the connection being such that the pan 10 may be readily removed for cleaning. To this end the driven member 24 is provided with an upwardly extending central stem 28 upon which is mounted a socket member 30 adapted to be attached to the pan. The socket member is removed from the stem 28 merely by a vertical lifting movement and when in place has its lower end seated on the driven member 24. The friction between the driven member 24 and the socket member is such, when the pan is loaded with nut meats, that no relative rotation will occur between the socket member and driven member.

The pan is preferably of the porcelain enamel type, and to provide a rigid connection between the socket member 30 and the pan such that the pan cannot be unduly flexed, a supporting plate 31 is mounted over the upper face of the socket member with cushioning means therebetween such as fiber disks 32. The supporting plate 31 is preferably of relatively large diameter and is flanged at its periphery as at 33, the flange bearing against the bottom of the pan 10 adjacent the periphery thereof. To hold the pan against the flange 33 and also to hold it in a central position, a bolt 34 extends downwardly through the bottom of the pan and is threaded into the socket member 30, a metal disk 35 and a cushioning fiber disk 36 being placed between the head of the bolt 34 and the bottom of the pan. Thus the pan is drawn downwardly at its center so that it is firmly seated on the flange 33 of the supporting member 31. A pan of such large diameter as this pan is usually formed with its bottom slightly raised in the center in a conical manner to avoid warpage during the enameling operation. The downward pressure of the bolt 34 tends to eliminate the conical form and to bring the bottom to a truly flat form.

In using the device, when the motor is running, the drive shaft normally causes the driven member 24, and hence the pan, to be rotated, the preloading of the bearing between the driven member 24 and shaft 20 providing a driving connection therebetween. However, when it is desired to stop the pan to remove nut meats therefrom, the periphery may be grasped and the pan thereby held. At such time the balls 23 serve their function of rolling elements to prevent an undue load being placed upon the motor 13. When it is desired to again start the rotation of the pan, it is merely released and the driven member 24 again rotates with the shaft 20.

From the above, it will be evident that I have provided a combined drive and support for rotating a relatively wide pan and at the same time permitting it to be stopped at will, with the driving means continuing to rotate and without placing an undue load on the driving means. The construction is inexpensive but rugged, and may be readily assembled, the pan being removable so that it may be cleaned without necessitating readjustment of the drive mechanism. It will also be evident that I have provided a novel method of assembling a drive of this character.

I claim as my invention:

1. A drive of the character described comprising, in combination, a drive shaft, a ball bearing including an inner race rigid with said shaft and an outer race, and a driven member having an annular portion fitting snugly on the outer race and exerting a squeezing pressure thereon whereby said races normally rotate together, the bearing having a rolling action when the driven member is held against rotation.

2. A drive of the character described comprising a vertical drive shaft, a ball bearing having an inner race rigidly secured on said shaft and an outer race, a driven member having a central bore to receive the end of said shaft, and a thrust element located within said bore, said driven member having an annular portion exerting a squeezing pressure on said outer race whereby said races normally rotate together, the bearing having a rolling action when the driven member is held against rotation.

3. A drive for rotating and supporting a pan or the like on a vertical axis comprising, in combination, a vertical drive shaft, means for supporting and for rotating said shaft, a bearing of the rolling element type mounted on but spaced from the upper end of said shaft and including an outer race, a driven member having a bore for receiving the end of said shaft, a thrust element located within said bore and bearing against said shaft, said driven member including means secured to said outer race to place the same under compression to hold the rolling elements therein under pressure, said rolling elements normally not rolling to cause said driven member to be driven by said shaft but being adapted to have a rolling action when the driven member is held against rotation, and means for mounting the pan on said driven member.

4. A drive for rotating and supporting a pan or the like on a vertical axis comprising, in combination, a vertical shaft, a driven member permanently mounted over the upper end of said shaft, a bearing of the rolling element type interposed between said driven member and said shaft with the roll elements held under radial inward pressure normally to cause said driven member and said shaft to rotate together, said elements having a rolling action when the driven member is held against rotation, and means detachably mounted upon said driven member for supporting the pan.

5. In a device of the character described, a base, driving mechanism supported by said base and including a vertical drive shaft, a driven member, a thrust element interposed between the upper end of said shaft and said driven member providing vertical support for said driven member, and means located in a plane below the upper end of said shaft and interposed between said shaft and said driven member to provide lateral support for said member to hold it against tipping, said means normally serving as a driving connection between said shaft and said driven member but being adapted to permit the driven member to be held against rotation without placing an excessive load on said shaft.

6. In a device of the character described, the combination of a rotary drive mechanism including a vertically extending rotating stem, a relatively wide pan supported and driven by said stem, a supporting plate for said pan having a peripheral upstanding flange upon which the pan is seated adjacent the periphery of the pan, a socket member located centrally of said plate and seated over said stem, and means extending through the pan bottom at the center thereof and the plate for holding the pan firmly seated on the upstanding flange of the plate and for rigidly securing the pan and plate to said socket member.

7. A drive assembly of the character described comprising, in combination, a drive shaft, a bearing race fixedly encircling said shaft, an outer bearing race encircling the first mentioned race, roller elements between said races, and means to be driven by said shaft including a member encircling said outer race and exerting radial inward pressure to place said roller elements under compression sufficient to hold the races normally against relative movement but permitting rolling action of said elements and relative movement between the races when said means is held against movement with said shaft.

GEORGE R. BLANCHARD.